E. UPTON.
CORN CULTIVATOR.
No. 179,434. Patented July 4, 1876.
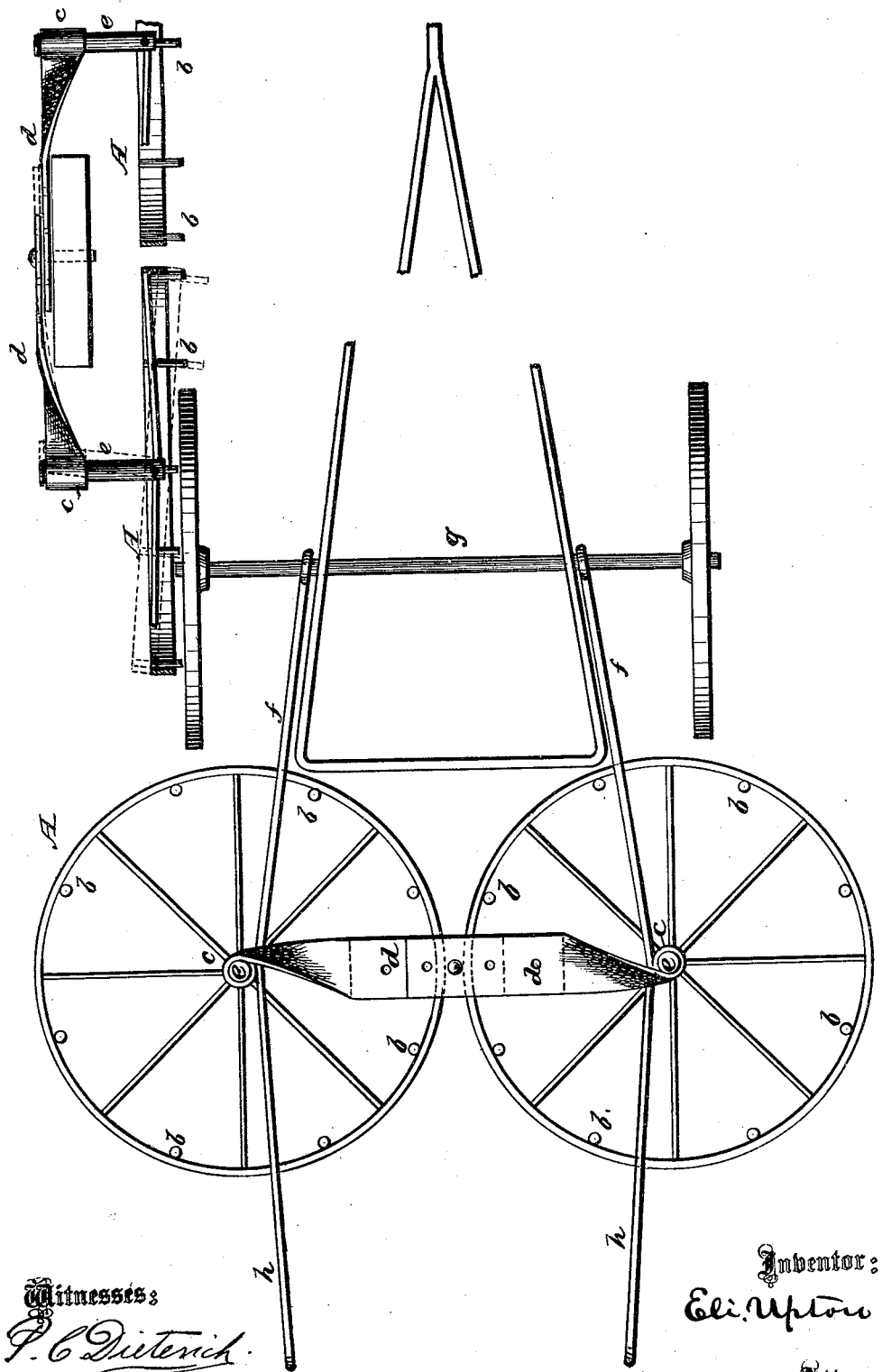

UNITED STATES PATENT OFFICE.

ELI UPTON, OF MORRISON, ILLINOIS.

IMPROVEMENT IN CORN-CULTIVATORS.

Specification forming part of Letters Patent No. 179,434, dated July 4, 1876; application filed January 3, 1876.

*To all whom it may concern:*

Be it known that I, ELI UPTON, of the city of Morrison, county of Whitesides, and State of Illinois, have invented certain new and useful Improvements in Corn - Cultivators, of which the following is a full and accurate description, reference being had to the accompanying drawings.

The object of my invention is to provide a corn-cultivator which, in its passage over or astride the row of corn, shall, at its front end, remove the clods, stalks, or rubbish from the corn, and which shall, at its rear end, carry to the corn the pulverized or finer earth.

Figure 1 is a perspective view of a machine embodying my invention.

A A are wheels, made of wood, iron, or other suitable material, and of sufficient width or diameter to rotate between the rows of corn without interfering with the latter. Into the rim of the wheels A A, and projecting from the lower side thereof, are inserted the teeth $b\ b$, &c. The axes of the wheels A A are, respectively, extended upward, and inserted at $c$ into the sockets $e\ e$ in the cross-beam $d$, such sockets being at each end of $d$, and extending down or nearly down to the spokes of A. It will be observed that the line of the sockets in the cross-beam $d$ diverges laterally from the perpendicular in passing upward. This has the effect of raising the inner and depressing the outer portion of the wheels A A from a true horizontal or from the plane of the ground. As the machine, therefore, is moved forward, the outer teeth, being forced farther into the ground than the inner ones, and, consequently, meeting more resistance, tend to align themselves into the line of draft—that is, backward and inward—thus revolving the front part of the wheels A A outward, and the rear part of the wheels inward. The advantage of this is, that while the corn is very young, short, and tender it is very difficult to run a machine near it without throwing upon the corn clods or rubbish, and this cultivator, by first moving the unbroken and unpulverized ground, and the stubble, old corn-stalks, or other trash, away from the corn, prepares for the bringing up to each side of the row of corn the fine pulverized dirt prepared by the stirring of the ground. One wheel, of course, is upon one side of the row, and the other upon the other; or, in other words, the corn passes to the rear between the wheels, being straddled by the team and the cultivator. The cross-beam $d$ is made of two sections, being lapped and joined at $i$ by a bolt passing vertically through corresponding holes in each. By means of this splicing and bolting of the cross-beam $d$ at the center thereof a joint is created, which permits the wheels A A to be drawn or swung laterally to follow the changes or crooks in rows of corn without cramping the machine or twisting the front axle. Also, by having a series of holes in each section of the cross-beam $d$, the distance between the wheels A A, and, consequently, their distance from the row, may be changed and regulated by varying the bolt in the center of $d$. To the inside and near the lower end of the sockets $e\ e$ are attached the draft-irons $f\ f$, which, at their front ends, are fastened to the axle $g$. From the point of attachment on the sockets $e\ e$ extend backward and upward the handles $h\ h$.

The front carriage and wheels need no further or more detailed description than that shown by the drawings; and it is expected that generally for this part of the machine will be substituted the front or rear carriage of the ordinary farm-wagon or any axle carried on two wheels.

By reason of the length of the sockets $e\ e$ the cross-beam $d$ is raised sufficiently high to permit corn of an advanced stage to pass thereunder without being broken.

I am aware that revolving frames containing teeth have been heretofore used for harrows, in which case the frames approached closely and nearly touched each other laterally, and necessarily so; and, for the reason that there was not room between the frames to allow the growing corn to pass, these harrows never were, and could not be, used for corn-cultivators.

What I claim as my invention, and desire to secure by Letters Patent, is—

The combination of the wheels A A, respectively, with the draft-rods $f\ f$, cross-beam $d$, axle $g$, and handles $h\ h$, whereby the said wheels may be readily raised, depressed, or moved laterally, all substantially as described, and for the purpose mentioned.

ELI UPTON.

Witnesses:
W. H. ALLEN,
W. M. KILGOUR.